United States Patent
Munshi et al.

(10) Patent No.: US 9,470,102 B2
(45) Date of Patent: Oct. 18, 2016

(54) CRACK RESISTANT TURBINE VANE AND METHOD FOR VANE CONTAINMENT CAP ATTACHMENT

(71) Applicant: Siemens Energy, Inc., Orlando, FL (US)

(72) Inventors: Mrinal Munshi, Orlando, FL (US); Shivashankar Vinay Amatiganahally, Orlando, FL (US); Eric L. Roach, Lexington, NC (US); Todd F. Young, Fort Mill, SC (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 14/522,648

(22) Filed: Oct. 24, 2014

(65) Prior Publication Data
US 2015/0044041 A1   Feb. 12, 2015

Related U.S. Application Data

(63) Continuation-in-part of application No. 13/467,298, filed on May 9, 2012.

(60) Provisional application No. 61/976,608, filed on Apr. 8, 2014.

(51) Int. Cl.
| | |
|---|---|
| F01D 1/02 | (2006.01) |
| B23P 6/00 | (2006.01) |
| B21D 53/78 | (2006.01) |
| F01D 9/04 | (2006.01) |
| F01D 5/00 | (2006.01) |
| F01D 5/18 | (2006.01) |
| F01D 5/20 | (2006.01) |
| F01D 11/14 | (2006.01) |

(52) U.S. Cl.
CPC ............... *F01D 9/041* (2013.01); *B23P 6/002* (2013.01); *F01D 5/005* (2013.01); *F01D 5/18* (2013.01); *F01D 5/186* (2013.01); *F01D 5/187* (2013.01); *F01D 5/20* (2013.01); *F01D 11/14* (2013.01); *F05D 2230/232* (2013.01); *Y10T 29/49318* (2015.01)

(58) Field of Classification Search
CPC . B23K 2201/001; F01D 9/044; F01D 9/041; F01D 11/14; F01D 5/186; F01D 5/20; F01D 5/187; F01D 5/005; F01D 5/18; B23P 6/002; Y10T 29/49318; F05D 2230/232–2230/239; F05D 2240/125
USPC ................ 228/101, 164–172, 174, 225–226; 415/211.2; 29/527.1, 889, 889.1, 29/889.21, 889.7, 889.72, 889.721, 29/DIG. 48
See application file for complete search history.

(56) References Cited

U.S. PATENT DOCUMENTS

| | | | |
|---|---|---|---|
| 3,137,782 A * | 6/1964 | Rieppel ................ | B23K 33/004 219/137 R |
| 3,899,267 A | 8/1975 | Dennis et al. | |
| 4,073,599 A * | 2/1978 | Allen ...................... | F01D 5/187 416/232 |
| 4,214,355 A | 7/1980 | Zelahy | |
| 4,633,554 A * | 1/1987 | Clark ................... | B23K 9/0026 219/137 R |
| 4,680,470 A * | 7/1987 | Heald .................. | G21C 17/002 250/358.1 |

(Continued)

*Primary Examiner* — Essama Omgba
*Assistant Examiner* — Darrell C Ford (57) ABSTRACT

A gas turbine vane containment cap is attached to an inboard surface of the vane inner shroud by penetrating flat weld filler, formed in a root gap between the cap and inner shroud. A semi-circular bead weld filler is formed outboard the penetrating weld filler closer to the vane exterior. Vane containment caps so welded are more resistant to in-service cracking along weldments.

19 Claims, 4 Drawing Sheets

(56) References Cited

U.S. PATENT DOCUMENTS

| | | | |
|---|---|---|---|
| 5,098,257 A | 3/1992 | Hultgren et al. | |
| 5,509,980 A | 4/1996 | Lim | |
| 5,822,852 A | 10/1998 | Bewlay et al. | |
| 6,332,272 B1 | 12/2001 | Sinnott et al. | |
| 6,491,208 B2 * | 12/2002 | James | B22F 5/04 228/119 |
| 6,558,119 B2 | 5/2003 | Lee et al. | |
| 6,837,417 B2 | 1/2005 | Srinivasan | |
| 6,908,288 B2 | 6/2005 | Jackson et al. | |
| 6,916,150 B2 | 7/2005 | Liang | |
| 7,278,829 B2 | 10/2007 | Roedl et al. | |
| 7,966,707 B2 * | 6/2011 | Szela | B23K 1/0018 228/118 |
| 2005/0091848 A1 | 5/2005 | Nenov et al. | |
| 2005/0196277 A1 | 9/2005 | Wang et al. | |
| 2008/0210347 A1 * | 9/2008 | Morin | C22F 1/10 148/527 |
| 2009/0212620 A1 * | 8/2009 | Coleman | B60B 3/02 301/63.104 |
| 2009/0313823 A1 * | 12/2009 | Rockstroh | B23P 6/007 29/889.1 |
| 2010/0247324 A1 | 9/2010 | Sato et al. | |
| 2011/0135483 A1 | 6/2011 | Hunt et al. | |
| 2011/0226390 A1 * | 9/2011 | Chen | C22C 19/00 148/527 |
| 2013/0298400 A1 | 11/2013 | Munshi et al. | |
| 2015/0343574 A1 * | 12/2015 | Ozbaysal | B23P 6/045 148/528 |

* cited by examiner

CRACK RESISTANT TURBINE VANE AND METHOD FOR VANE CONTAINMENT CAP ATTACHMENT

CROSS-REFERENCE TO RELATED APPLICATION

This application is a continuation-in-part of United States utility patent application entitled "METHOD OF PROVIDING A TURBINE BLADE TIP REPAIR", filed May 9, 2012, and assigned serial number 13/467,298, now U.S. Pat. No. 9,186,757, issued Nov. 17, 2015; and claims priority to provisional patent application entitled "METHOD FOR VANE CONTAINMENT CAP ATTACHMENT WITH CRACK RESISTANCE" filed Apr. 8, 2014, and assigned serial number 61/976608. Both of the above-cited applications are fully incorporated by reference herein, in their entirety. This application also incorporates by reference in its entirety U.S. Pat. No. 5,098,257, entitled "APPARATUS AND METHOD FOR MINIMIZING DIFFERENTIAL THERMAL EXPANSION OF GAS TURBINE VANE STRUCTURES", issued Sep. 10, 1990.

BACKGROUND OF THE INVENTION

1. Field of the Invention

The invention relates to gas turbine vanes and more particularly, methods for welding vane containment caps to gas turbine vane inner shroud inboard surfaces for enhanced in-service crack resistance along the welds.

2. Description of the Prior Art

As explained in greater detail in U.S. Pat. No. 5,098,257,, which is incorporated herein by reference, a portion of the annular gas flow path in the turbine section of a gas section is formed by a plurality of vane segments circumferentially arrayed around the rotor. Each vane segment is comprised of an inner and an outer shroud, which together form the boundaries of the gas flow path, and one or more vanes. In order to insure that the material forming the vane segments is not overheated, thereby compromising its strength, the vane segments of modern gas turbines are cooled with air bled from the compressor section. This cooling air is often supplied to both the inner and outer shrouds, from which it is distributed throughout the vane segments. In order to utilize this cooling air effectively, external structures are formed on the vane segment shrouds to contain and distribute the cooling air. Typically, these structures are attached to the surfaces of the shrouds opposite the surfaces exposed to the hot gas flowing through the turbine section.

Figures 1, 2:
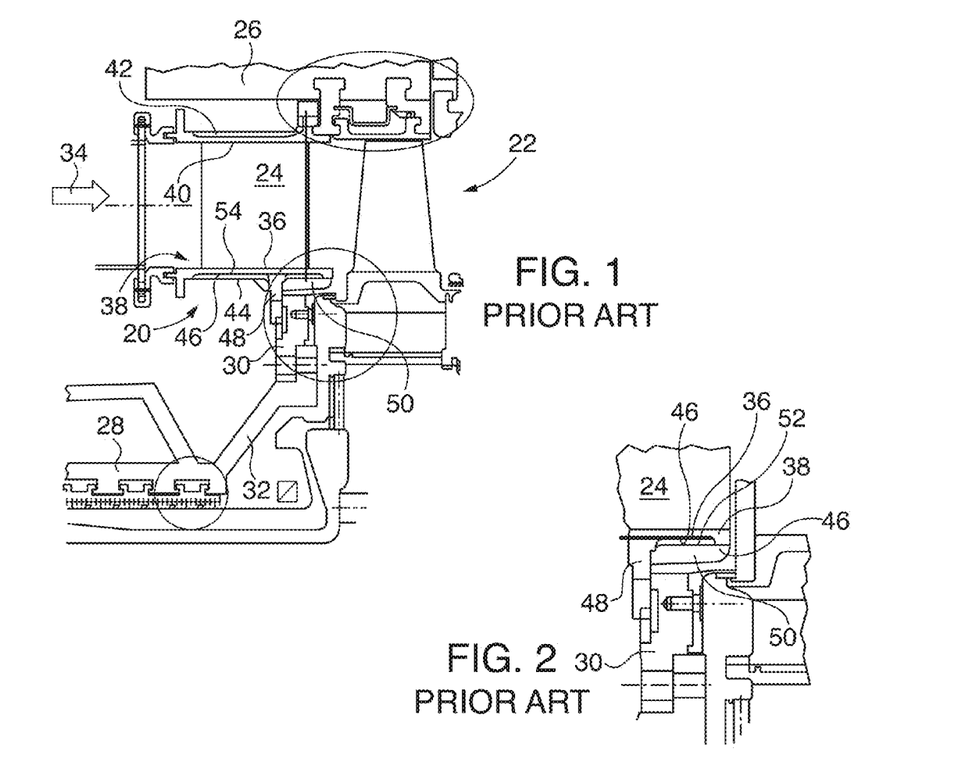
FIG. 1 is a schematic cross sectional elevation of a known gas turbine engine vane inner shroud and left/right containment caps interface.
FIG. 2 is a detailed view of the known inner shroud and right containment cap interface of FIG. 1.

General structure of an exemplary known gas turbine Row 1 vane 20 and downstream Row 1 blade 22 are shown in FIGS. 1 and 2. Vane segments 24 are encased by a blade ring 26. Also, the vane segments 24 encircle an inner cylinder structure 28. The inner cylinder structure comprises a ring 30 affixed to a rear flange 32 of the inner cylinder 28. During operation, hot gas (arrow 34) from the combustion section (not shown) is directed to flow over the vane segments 24. The flow of hot gas 34 is contained between the outboard surface 36 of the inner shroud 38 and the inboard surface 40 of the outer shroud 42. As explained in greater detail in U.S. Pat. No. 5,098,257, which is incorporated herein by reference, cooling air is bled from the compressor section, thus bypassing the combustors, and is supplied to the inner 38 and outer 42 shrouds. A portion of the cooling air flows through one or more holes in the blade ring 26, from whence it enters the outer shroud 42 into the vane segment 24 and flows through the vane air foil. Some cooling air discharges into the hot gas 34 through holes (not shown) in the walls of the airfoil portion of the vane segment 24. A portion of the cooling air 10 flows through holes formed in the inner shroud 38 and is contained by a pan-like left containment cap 44. The left containment cap 44 is affixed to the inboard surface 46 of the inner shroud 38. As a structural lug 48 emanates radially inward from the inboard surface 46 of the inner shroud 38, the left containment cap 44 serves to prevent leakage of cooling air to the turbine section by being welded to the inner shroud and the lug. Cooling air in the left containment cap 44 flows through an opening in the lug 48 (not shown) and enters a right containment cap 50, which also contains the cooling air. The right containment cap 50 is also welded to the inboard surface 46 of the inner shroud 38, in similar fashion as the left containment cap 44. The containment caps 48 and 50 thus allow cooling air to circulate on the inboard side of the inner shroud 38 but constrain the cooling air from venting radially inwardly toward the centerline of the turbine.

Figure 3:
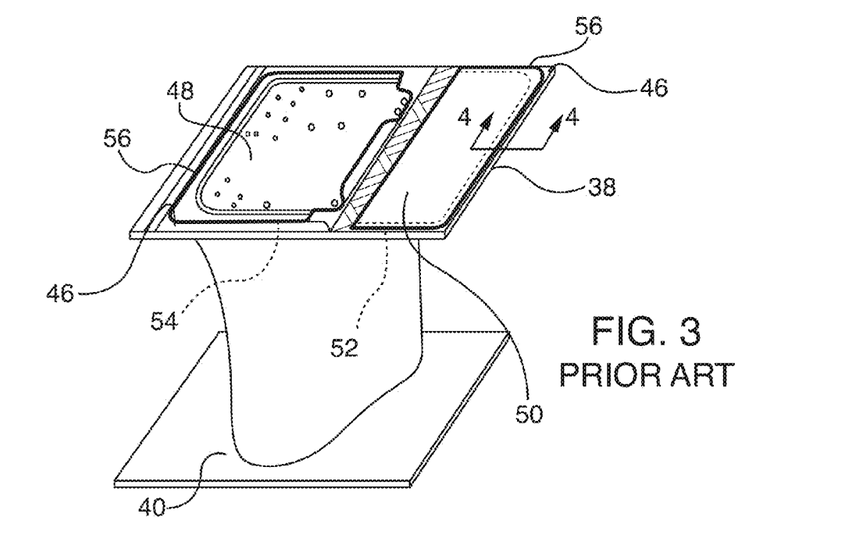
FIG. 3 is a schematic perspective view of the known inner shroud and left/right containment caps interface of FIG. 1, including known fillet weld bead lines between containment cap rims and the inner shroud inboard surface.
Figure 4:
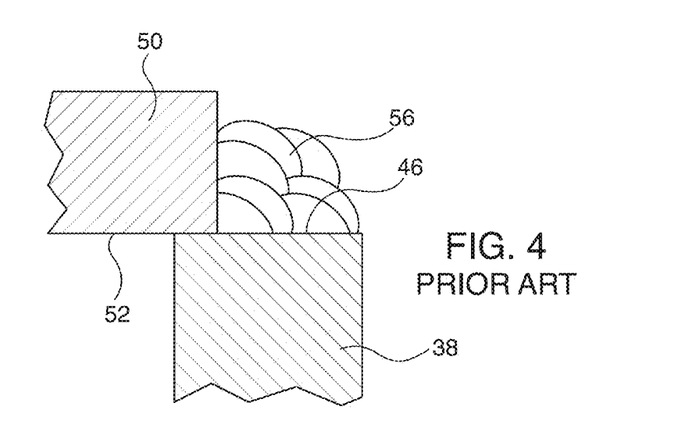
FIG. 4 is a cross sectional view of a known fillet weld bead line between the containment cap rim and the inner shroud inboard surface viewed along 4-4 of FIG. 3.

As shown in the enlarged FIG. 2 and in the FIG. 3 perspective view, the rim 52 of the right containment cap 50 and the rim 54 of the left containment cap 44 are welded to the inboard surface 46 of the inner shroud 38 by weld bead 56. Further discussion of containment cap welding herein applies equally to either the left containment cap 44 or the right containment cap 50, but for simplicity future reference will focus on the right containment cap structure 50 or "the containment cap 50". Referring to FIG. 4, the known weld bead 56 is a built-up fillet weld formed on the peripheral boundaries of the adjacent rim surface 52 of the right containment cap 50 and the inboard surface 46 of the inner shroud 38. The adjacent surfaces of the rim 52 and the inboard surface 46 are not bonded to each other, leaving a crevice between those surfaces.

Figure 5:
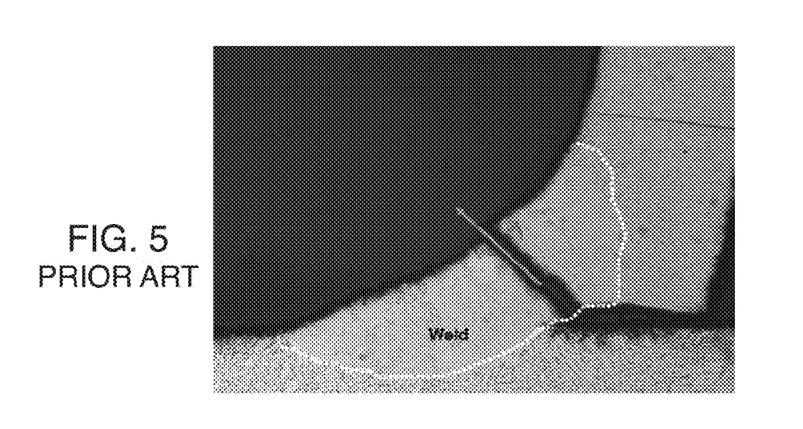
FIG. 5 is a photograph of a stress riser induced crack in a known fillet weld bead formed between a known containment cap rim and an inner shroud inboard surface.

The fillet weld 56 is susceptible to cracking while the turbine engine is in service. The weld 56 initiated crack can propagate from the inboard side of the weld, where the crevice exists between the rim 52 and inboard surface 46, through the rest of the containment cap 50. The crack so formed may lead to an unplanned service outage. Less severe crack propagation in the fillet weld 56 and containment cap 50 may not cause a service outage and will be found during scheduled routine maintenance inspection when the engine is being repaired. Unfortunately, the fillet weld 56 and/or propagated containment cap 50 cracks may be too severe for service repair, leading to scrapping an expensive vane segment 24. As shown in the FIG. 5 photograph cross section of an actual known fillet weld crack, it appears that the fillet weld between the cap 50 and the vane inner shroud inboard surface 46 creates a stress riser, leading to the crack initiation. Substitution for different weld filler materials to form the fillet weld 56 has not resolved the crack initiation problem.

SUMMARY OF THE INVENTION

The crack initiation problem in the weld between a turbine vane inner shroud and its containment cap(s) has been resolved by new method for welding a containment cap to a turbine vane during initial vane manufacture or subsequent repair after the vane has been in operational service. The new welding method does not require redesign or replacement of present containment cap or turbine vane components.

The new method for welding a containment cap to a turbine vane orients the vane containment cap rim surface relative to the vane inner shroud inboard surface in an opposed, spaced relationship so that a root gap is defined between the opposing components. A penetrating flat weld filler is formed in the root gap, so that there is direct bonding between the vane and the cap. A semi-circular bead weld filler is formed outboard the flat weld filler closer to an exterior of the turbine vane and cap.

Exemplary embodiments of the invention feature a gas turbine vane, comprising an inner shroud having an inboard surface. A vane containment cap having a rim surface is in opposed spaced orientation relative to the inboard surface. A root gap is between the rim and inboard surfaces. The rim and inboard surfaces are welded to each other by a penetrating flat weld filler formed in and filling the root gap and by a semi-circular bead weld filler that is formed outboard the penetrating weld filler closer to an exterior of the turbine vane.

Other exemplary embodiments of the invention feature a method for welding a vane containment cap to a gas turbine vane, by providing an inner shroud having an inboard surface and a vane containment cap having a rim surface. The vane containment cap rim surface is oriented relative to the vane inner shroud inboard surface in opposed spaced relationship, so that a root gap is defined between the rim and inboard surfaces. The rim and inboard surfaces are welded to each other by forming a penetrating flat weld filler in the root gap and thereafter forming a semi-circular bead weld filler outboard the penetrating weld filler closer to an exterior of the turbine vane.

Additional exemplary embodiments of the invention feature a method for replacing a containment cap of a gas turbine vane, comprising removing an existing containment cap from a gas turbine vane inner shroud, exposing an inboard surface thereof. The inner shroud inboard surface is prepared for joining with a replacement containment cap, for example by grinding off previously applied weld material. A replacement vane containment cap having a rim surface is provided. The replacement vane containment cap rim surface is oriented relative to the vane inner shroud inboard surface in opposed spaced relationship, so that a root gap is defined between the rim and inboard surfaces. The rim and inboard surfaces are welded to each other by forming a penetrating flat weld filler in the root gap. Thereafter a semi-circular bead weld filler is formed outboard the penetrating weld filler closer to an exterior of the turbine vane.

In some exemplary embodiments of the invention a beveled surface is formed on the containment cap rim or the vane inner shroud inboard surface that is in communication with the root gap for easier welding access to the root gap when forming the flat weld bead. Then the semi-circular bead weld is formed between the beveled surface and the other mating surfaces on the vane and/or containment cap rim.

In other exemplary embodiments of the invention the weld filler material has higher ductility than the inner shroud or the containment cap material.

The respective features of the exemplary embodiments of the invention may be applied jointly or severally in any combination or sub-combination by those skilled in the art.

BRIEF DESCRIPTION OF THE DRAWINGS

The teachings of the exemplary embodiments of the invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will realize that the exemplary embodiments of the invention can be utilized to weld a gas turbine vane inner shroud inboard surface to a containment cap in a way that reduces likelihood of crack formation in their joining weldments. Reducing likelihood of crack formation in the weldments and also reduces likelihood of subsequent crack propagation to the containment cap structure or the vane shroud structure. When practicing embodiments of the invention, a root gap is established between the opposed mating surfaces of the containment cap and vane inner shroud inboard surface, so that a penetrating flat bead weld is formed in the gap, joining the mating surfaces. The penetrating flat bead weld allows vane and cap flexure, yet has a lower propensity to form stress riser cracks between the joined surfaces than the known previously utilized fillet weld beads on the periphery of known adjacent, non-joined mating surfaces. In exemplary embodiments of the invention, a complimentary semi-circular weld bead is formed outboard the penetrating flat weld to provide additional structural strength and reduce likelihood that a crack initiates in the flat weld. In the event that a crack should initiate within the flat weld, the semi-circular weld bead also contains the initiated crack and inhibits likelihood of further crack propagation. Thus the combination of the flat weld and semi-circular weld beads complement each other, providing combined synergistic crack propagation inhibiting/containment benefits that neither weld bead provides alone.

The methods for welding the containment cap and inner shroud inboard surface in accordance with exemplary embodiments of the invention and the finished turbine vane product are now described in greater detail. If desired, the vane 20, including its inner shroud outboard surface 42, and the containment cap 50 receive component pretreatment, using known pretreatment methods suitable for the component materials and the desired weld filler, such as known age heat treatment and solution heat treatment procedures. Often the vane 20 is constructed from cobalt-based or nickel-based alloys, such as the alloys sold under the registered United States trademarks ECY 768® alloy, INCONEL 939® alloy or CM 247® alloy. The containment caps 44 and 50 are often constructed from alloys sold under the registered United States trademarks INCONEL 625® alloy, HAST X® alloy or from a 403 grade stainless steel sold by many manufacturers. Exemplary weld fillers used to weld the containment caps to the vane include weld wire alloys sold under the registered United States trademarks HAYNES 188® alloy, HAYNES 262® alloy and MAR M 918® alloy. These exemplary weld filler alloys have higher ductility and lower modulus of elasticity than the aforementioned exemplary vane and containment cap alloys.

As described in the co-pending parent patent application serial number 13/467,298, now U. S. Pat. No. 9,186,757, of this application, which is directed to turbine blade repair, weld joints at a connection between a blade tip cap and repair surface of a gas turbine blade formed from weld filler having a higher ductility and lower modulus of elasticity than the blade components reduce the stress and the possibility of any resultant cracking occurring at the weld location during operation of the engine. As also noted in the parent application low modulus weld filler materials generally require a lower heat input to form weld joints, with a resulting reduced heating of the underlying repaired surfaces. The reduction in weld heating reduces propensity for cracks in the region of the weld joint during the welding and repair process of the turbine blade. It has been determined that similar use of higher ductility/lower modulus of elasticity weld filler materials also reduces crack propensity when welding turbine vanes and containment caps of lower ductility and higher modulus of elasticity.

Figure 6:
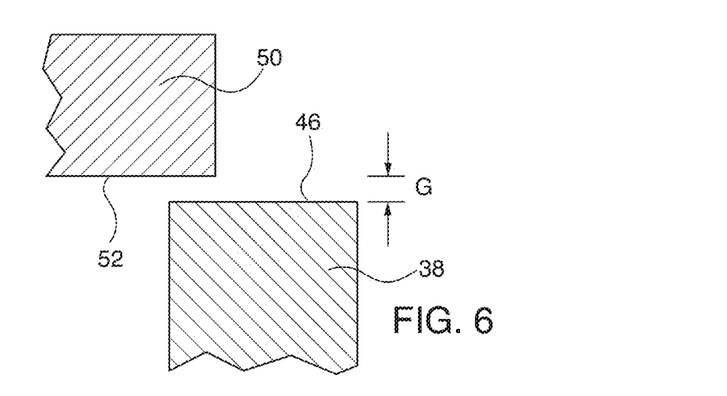
FIG. 6 is a schematic elevational view of spaced orientation and alignment of a containment cap rim and inner shroud inboard surface, and establishment of a root gap G there between, prior to welding the components, in accordance with an exemplary embodiment of the invention.
Figure 7:
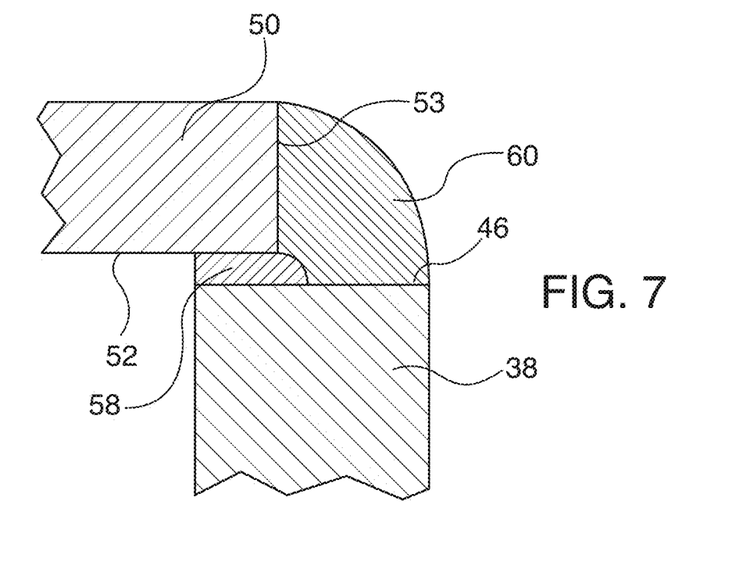
FIG. 7 is a schematic elevational view of the containment cap rim and inner shroud inboard surface of FIG. 6, after formation of a flat weld bead in the gap G and a subsequent semi-circular weld bead outboard of the flat weld bead, in accordance with an exemplary embodiment of the invention.

An exemplary embodiment of the invention for welding a containment cap to a turbine vane and the finished vane are shown in FIGS. 6 and 7. After completion of any pretreatment processes, the turbine vane 38 inboard surface 46 and a rim surface 52 of a containment cap 50 are aligned in their desired final relative assembly opposed orientations prior to welding them together, separated by a root gap G of a dimension sufficient for formation of a penetrating weld in the gap that will ultimately bond those component surfaces. Once the gap G is established through use of known fixtures a flat penetrating weld 58 is formed between the containment cap 50 rim 52 and the inboard surface 46 of the inner shroud 38, using known welding techniques. In FIG. 7. the weld is customarily formed by introducing welding filler from the right side of the figure into the gap G. Thereafter a semi-circular weld bead 60 is formed between the outer face 53 of the containment cap 50 and the vane inboard surface 46, also using known welding techniques. Benefits of the semi-circular profile weld bead for repair of turbine blade tips are described in the co-pending parent patent application serial number 13/467,298, now U.S. Patent No. 9,186,757, of this application. It has been found that the same beneficial properties of crack resistance are applicable to the semi-circular weld bead 60 profile. Furthermore, use of a relatively higher ductility/lower modulus of elasticity weld filler for the flat penetrating weld 58 and the semi-circular weld 60 than the materials used to manufacture the containment caps 42, 50 or vane 20 further reduces crack formation propensity of either or both welds.

Figure 8:
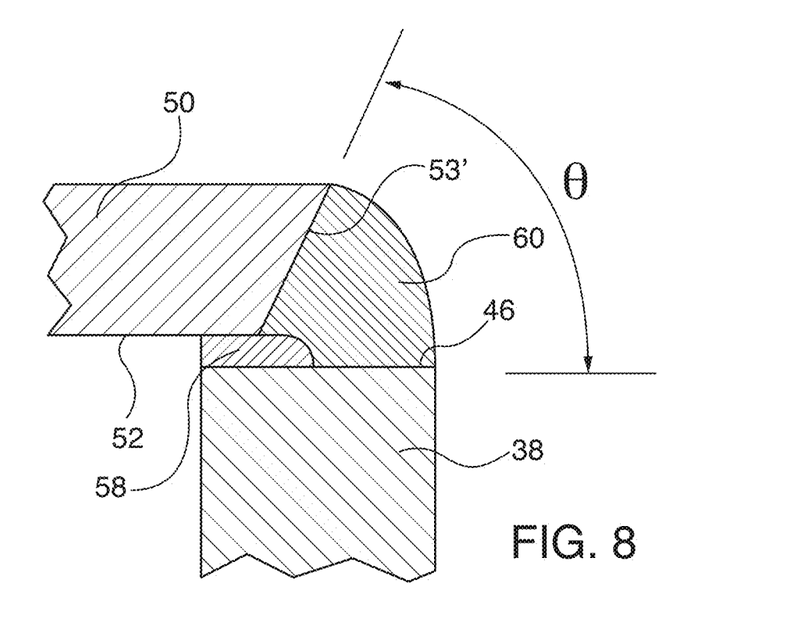
FIG. 8 is a schematic elevational view of the containment cap rim and inner shroud inboard surface, after formation of the welds, in accordance with an alternative exemplary embodiment of the invention.
Figure 9:
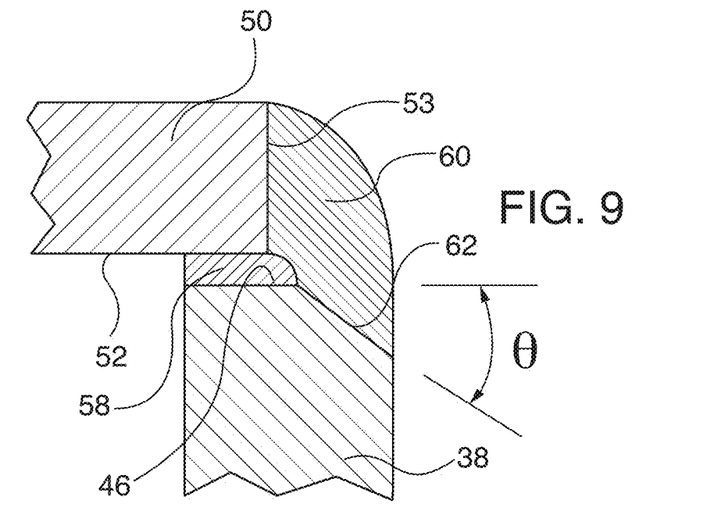
FIG. 9 is a schematic elevational view of the containment cap rim and inner shroud inboard surface, after formation of the welds, in accordance with another alternative exemplary embodiment of the invention.
Figure 10:
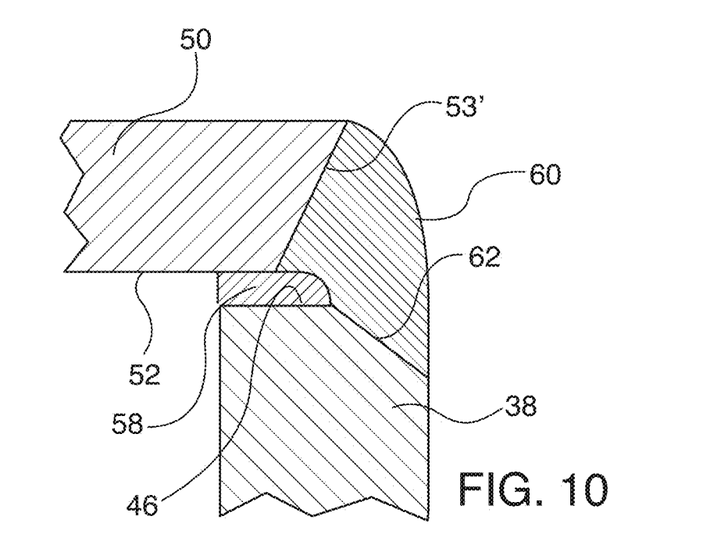
FIG. 10 is a schematic elevational view of the containment cap rim and inner shroud inboard surface, after formation of the welds, in accordance with yet another alternative exemplary embodiment of the invention.

More convenient access welding access to the gap G, for introduction of welding filler used to form the flat penetrating weld is provided in the alternative embodiments of FIGS. 8-10 by adding one or more beveled surfaces 53' and/or 62 outboard the gap on the exterior side of the vane shroud 38 and the containment cap 50. After formation of the flat penetrating weld 58 the opposing bevel(s) 53'/62 and/or surface(s) 53/46 are joined with the outboard formed semi-circular weld bead 60. An exemplary bevel angle θ for either of the beveled surfaces 53'/62 is between approximately 45-60, degrees.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A stress-crack resistant gas turbine vane, comprising:
    an inner shroud having an inboard surface and an outer surface;
    a vane containment cap having a rim surface in opposed spaced orientation above the inboard surface, defining a root gap between the rim and inboard surfaces, and an outer face adjacent the rim surface, the outer face being offset from and noncoplanar to the outer surface of the inner shroud;
    the rim and inboard surfaces welded to each other by a penetrating flat weld filler formed in and filling the root gap, and an intact, semi-circular profile bead weld filler outboard the penetrating weld filler, joining the containment cap outer face and the inboard surface on an exposed exterior of the turbine vane; and
    the flat weld filler allowing inner shroud and vane containment cap relative flexure, while resisting formation of stress riser cracks in the semi-circular profile bead weld filler, and the bead weld filler resisting formation of, or subsequent propagation of, separation stress cracks in the flat weld filler.

2. The vane of claim 1 further comprising:
    a beveled surface formed on the inboard surface and exposed to the turbine vane exterior, for penetrating weld filler access to the gap during formation of the flat penetrating weld; and the semi-circular bead weld formed on the beveled surface, joining the inner shroud inboard surface and the containment cap outer face.

3. The vane of claim 1 further comprising:
a beveled surface formed on the inboard surface or the rim outer face that is adjacent to the rim surface or on both thereof, and exposed to the turbine vane exterior, for penetrating weld filler access to the gap during formation of the flat penetrating weld; and
the semi-circular bead weld formed on the beveled surface or respective beveled surfaces, joining the inner shroud inboard surface and the containment cap outer face.

4. The vane of claim 1 further comprising:
a beveled surface formed on the rim outer face that is adjacent to the rim surface and exposed to the turbine vane exterior, for penetrating weld filler access to the gap during formation of the flat penetrating weld; and
the semi-circular bead weld formed on the beveled surface, joining the inner shroud inboard surface and the containment cap outer face.

5. The vane of claim 4, the beveled surface bevel having an angular range between approximately 45 and 60 degrees.

6. The vane of claim 4, the weld filler material having higher ductility than the inner shroud or the containment cap, for inhibiting subsequent crack formation in the weld after installation of the vane within a gas turbine engine and operation of the engine.

7. The vane of claim 1, the weld filler material having higher ductility than the inner shroud or the containment cap, for inhibiting subsequent crack formation in the weld after installation of the vane within a gas turbine engine and operation of the engine.

8. A method for welding a vane containment cap to a gas turbine vane and inhibiting formation in applied weld filler during subsequent engine operation, comprising:
providing an inner shroud having an inboard surface and an outer surface;
providing a vane containment cap having a rim surface and an outer face adjacent the rim surface;
orienting the vane containment cap rim surface above the vane inner shroud inboard surface in opposed spaced relationship, defining a root gap between the rim and inboard surfaces, the outer face being offset from and noncoplanar to the outer surface of the inner shroud;
welding the rim and inboard surfaces to each other by forming a penetrating flat weld filler in the root gap, and thereafter forming a semi-circular profile bead weld filler outboard the penetrating weld filler, joining the containment cap outer face and the inboard surface on an exposed exterior of the turbine vane, leaving all of the applied semi-circular bead intact;
installing the welded vane in a gas turbine engine; and
operating the engine, the flat weld filler allowing inner shroud and vane containment cap relative flexure, while resisting formation of stress riser cracks in the semi-circular profile bead weld filler, and the bead weld filler resisting formation of, or subsequent propagation of, separation stress cracks in the flat weld filler.

9. The method of claim 8, further comprising originating formation of the penetrating flat weld filler by accessing the root gap from the exterior of the turbine vane.

10. The method of claim 9, further comprising:
prior to orienting the vane containment cap, forming a beveled surface on the rim outer face that is adjacent to the rim surface in a position that is exposed to the turbine vane exterior after said orientation;
orienting the vane containment cap rim surface relative to the vane inner shroud inboard surface, so that the beveled surface is in communication with the root gap and exposed to the turbine vane exterior;
forming the penetrating flat weld by accessing the root gap between the beveled surface and the vane inner shroud inboard surface; and
forming the semi-circular bead between the beveled surface and the vane inner shroud inboard surface, joining the inner shroud inboard surface and the containment cap outer face.

11. The method of claim 10, further comprising forming the beveled surface bevel within an angular range between approximately 45 and 60 degrees.

12. The method of claim 11, the weld filler material having higher ductility than the inner shroud or the containment cap, for inhibiting subsequent crack formation in the weld after installation of the vane within a gas turbine engine and operation of the engine.

13. The method of claim 10, the weld filler material having higher ductility than the inner shroud or the containment cap, for inhibiting subsequent crack formation in the weld after installation of the vane within a gas turbine engine and operation of the engine.

14. The method of claim 9, further comprising:
prior to orienting the vane containment cap, forming a beveled surface on the vane inner shroud inboard surface in a position that is exposed to the turbine vane exterior after said orientation;
orienting the vane containment cap rim surface relative to the vane inner shroud inboard surface to that the beveled surface is in communication with the root gap and exposed to the turbine vane exterior;
forming the penetrating flat weld by accessing the root gap between the beveled surface and the rim surface; and
forming the semi-circular bead between the beveled surface and the rimmed surface, joining the inner shroud inboard surface and the containment cap outer face.

15. The method of claim 8, the weld filler material having higher ductility than the inner shroud or the containment cap, for inhibiting subsequent crack formation in the weld after installation of the vane within a gas turbine engine and operation of the engine.

16. A method for replacing a containment cap of a gas turbine vane and inhibiting crack formation in weld filler during subsequent engine operation, comprising:
removing an existing containment cap from a gas turbine vane inner shroud, exposing an inboard surface and an outer surface thereof;
preparing the inner shroud inboard surface for joining with a replacement containment cap;
providing a replacement vane containment cap having a rim surface, and an outer face adjacent the rim surface;
orienting the replacement vane containment cap rim surface above the vane inner shroud inboard surface in opposed spaced relationship, defining a root gap between the rim and inboard surfaces, the outer face being offset from and noncoplanar to the outer surface of the inner shroud; and
welding the rim inboard surfaces to each other by forming a penetrating flat weld filler in the root gap and thereafter forming a semi-circular profile bead weld filler outboard the penetrating weld filler, joining the containment cap outer face and the inboard surface on an exposed exterior of the turbine vane, leaving all of the applied, semi-circular bead intact;

installing the welded vane in a gas turbine engine; and operating the engine, the flat weld filler allowing inner shroud and vane containment cap relative flexure, while resisting formation of stress riser cracks in the semi-circular profile bead weld filler, and the bead weld filler resisting formation of, or subsequent propagation of, separation stress cracks in the flat weld filler.

17. The method of claim 16, further comprising originating formation of the penetrating flat weld filler by accessing the root gap from the exterior of the turbine vane.

18. The method of claim 17, further comprising:

prior to orienting the replacement vane containment cap, forming a beveled surface on the rim outer face that is adjacent to the rim surface in a position that is exposed to the turbine vane exterior after said orientation;

orienting the replacement vane containment cap rim surface relative to the vane inner shroud inboard surface, so that the beveled surface is in communication with the root gap and exposed to the turbine vane exterior;

forming the penetrating flat weld by accessing the root gap between the beveled surface and the vane inner shroud inboard surface; and forming the semi-circular bead between the beveled surface and the vane inner shroud inboard surface, joining the inner shroud inboard surface and the containment cap outer face.

19. The method of claim 16, the weld filler material having higher ductility than the inner shroud or the containment cap, for inhibiting subsequent crack formation in the weld after installation of the vane within a gas turbine engine and operation of the engine.

* * * * *